Dec. 1, 1970   J. H. OXLEY   3,544,359
PROCESS FOR PREPARING PARTICULATE CERMETS
Filed Feb. 26, 1965

*INVENTOR.*
JOSEPH HUBBARD OXLEY
BY *Ernest A. Polin*
ATTORNEY

United States Patent Office 3,544,359
Patented Dec. 1, 1970

3,544,359
PROCESS FOR PREPARING PARTICULATE
CERMETS
Joseph Hubbard Oxley, Columbus, Ohio, assignor, by
mesne assignments, to Allied Chemical Corporation,
New York, N.Y., a corporation of New York
Filed Feb. 26, 1965, Ser. No. 435,421
Int. Cl. C23c 11/02
U.S. Cl. 117—100           10 Claims

ABSTRACT OF THE DISCLOSURE

A process for producing particulate cermets of refractory metal containing refractory ceramic particles embedded and dispersed therein, whereby a halide of a refractory metal, hydrogen and finely divided refractory ceramic particles, are introduced into a fluidized bed of seed particles of refractory metal particles, refractory metal particles having refractory ceramic particles embedded and dispersed therein or refractory ceramic particles at a temperature so that the halide is reduced and codeposited on the seed particles with the refractory ceramic particles. The resultant cermets can be compacted and sintered to form structures lighter in weight than refractory metal structures alone, and thermal expansion properties can be varied as desired.

Figure 1:
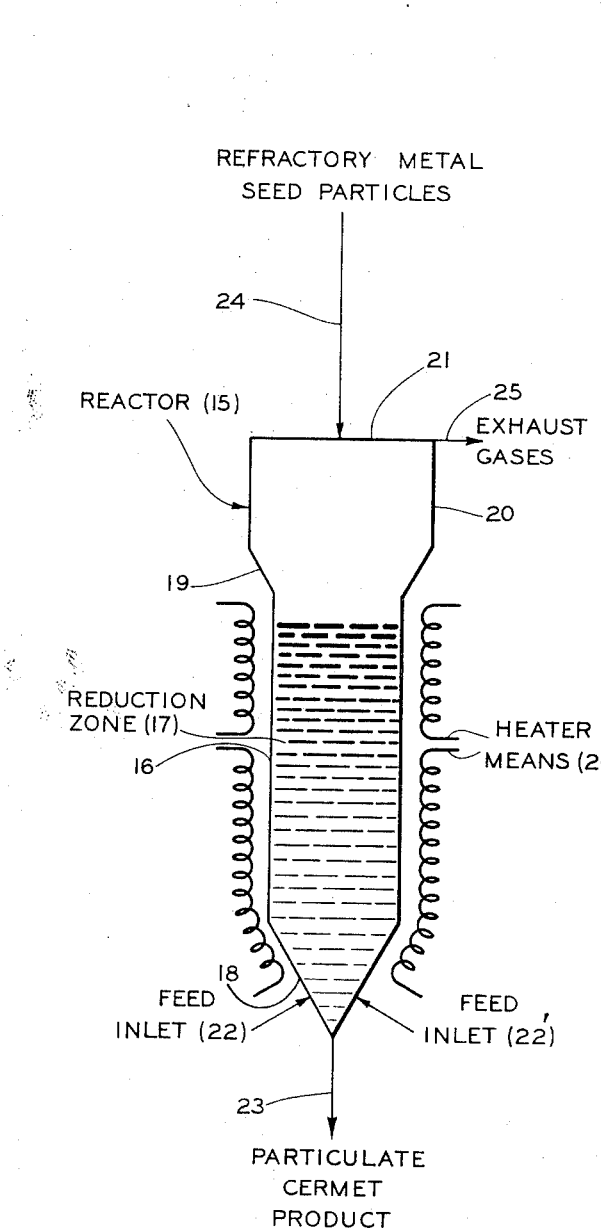

In general, this invention relates to cermets consisting essentially of high-purity refractory metal and refractory ceramic particles, and to a process for production of the same.

Advancing technological requirements have placed tremendous demands on various materials of construction. Construction materials have been exposed to conditions and environments that have demanded the utmost in physical properties. Structures of refractory metal cermets, such as tungsten dispersion alloys, because of their exceptional and excellent resistance to thermal shock and creep, high-temperature properties, and the like, are of unusual utility for such applications. For example, a tungsten-thorium oxide cermet provides an exceptionally high-melting-point material with excellent resistance to creep and is of utility as a rocket nozzle material; also various tungsten-refractory oxide cermets containing as low as one percent by weight and less of refractory oxide are useful electrical filaments.

In the past, refractory metal cermets have been produced by a number of different methods. Refractory metals have been plated on refractory ceramic particles and the resulting particulate product compacted and sintered. Refractory metals have been produced by hydrogen reduction of the refractory metal halide with a deposition of the refractory metal so produced on fluidized particles of a refractory oxide and the resulting particulate product subsequently compacted and sintered. Salts also have been introduced into a molten refractory metal and by a subsequent treatment, as by sintering, the salt converted to an oxide to provide the cermet or alloy having a refractory oxide dispersed therein.

It is an object of this invention to provide a process for producing cermets consisting essentially of high-purity refractory metal and refractory ceramic particles.

It is another object to provide a process for producing such cermets by concurrently introducing a refractory metal halide, hydrogen, and fine refractory ceramic particles into a fluidized bed of refractory seed particles to produce a refractory metal which deposits as a coating on the fluidized seed particles and in so depositing entraps refractory ceramic particles in the deposited coating.

Still another object is to provide requisite and particular process conditions, materials used, and the like, which favor substantially complete reduction of the refractory metal halide to the refractory metal and also substantial codeposition of the so-produced refractory metal and the introduced refractory ceramic particles onto the fluidized seed particles.

A further object is to provide a process resulting in controlled ratios of refractory ceramic particles to refractory metal in the cermet.

Still a further object is to provide a process wherein particles of a refractory ceramic material are entrained in any or all of a stream of hydrogen, or a fluidization gas, or a vapor-state refractory metal halide, or an admixture of these when introduced into a reactor containing a fluidized bed of refractory seed particles and while within the reactor the introduced refractory ceramic particles are bonded to the fluidized seed particles by refractory metal produced and deposited on the fluidized seed particles within the reactor.

An additional object is to provide a process adapted for continuous production of particulate cermets consisting essentially of high-purity refractory metal and refractory ceramic particles.

Figure 2:
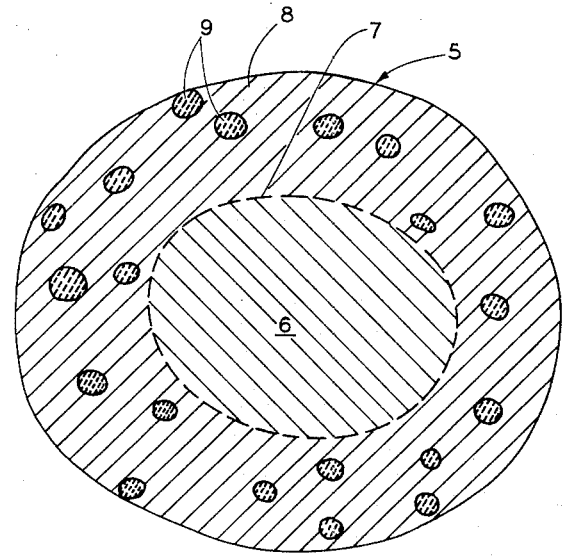
Figure 3:
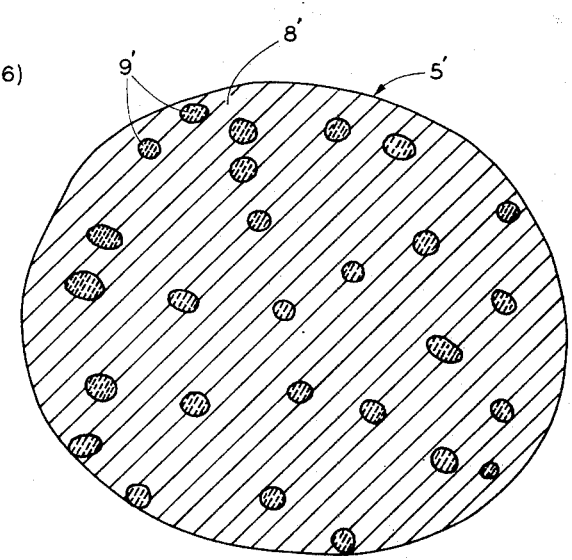

All these and other objects will be apparent to those skilled in the art from the description which follows, including the drawings, in which:

FIG. 1 is a diagrammatic illustration of a suitable apparatus for carrying forth one embodiment of the process; and FIGS. 2 and 3 are enlarged cross-sectional views of cermet particles of the invention.

The invention comprises particulate cermets consisting essentially of a plurality of minute refractory ceramic particles embedded and dispersed in a high-purity refractory metal and a process for producing such cermets. The process includes feeding finely divided refractory ceramic particles, preferably refractory oxide particles, into a reactor wherein a refractory metal, produced by hydrogen reduction of a vapor-state halide of the refractory metal, is codeposited along with refractory ceramic particles onto fluidized refractory seed particles within the reactor. In the process, the refractory ceramic particles are introduced into the reactor while entrained and suspended in one or more of the reactants charged to the reactor to produce the refractory metal or in a fluidization gas introduced to assist in maintaining the seed particles within the reactor in a fluidized state. In the process, the introduced finely divided refractory ceramic particles are codeposited along with the produced refractory metal on the fluidized refractory seed particles.

In one embodiment of the invention, the particulate cermets consist essentially of refractory metal core particles coated with a shell of a refractory metal matrix having refractory ceramic particles embedded therein. Another embodiment involves particulate cermets prepared using seed particles composed of a refractory metal having refractory ceramic particles dispersed therein. In this embodiment, the particulate cermets consist essentially of refractory ceramic particles dispersed throughout a refractory metal. In all of the embodiments, the refractory metal is a high-purity refractory metal of extremely fine crystals. Theoretically, particulate cermets containing a ratio of up to about three times as much, by volume, of refractory ceramic particles to refractory metal are possible. As a practical matter, the process is of greatest utility when the produced particulate cermets contain less than 50 percent, by volume, of refractory ceramic particles, and desirably only up to about 25 percent, by volume, of refractory ceramic particles.

In the applications of greatest utility, the particulate cermets are compacted and sintered into a structure or article for the intended application. Advantageously, in such structures, the fine refractory ceramic particles function as grain-growth inhibitors for the refractory metal compacted during fabrication and use. Additionally, the resulting compacted and sintered structures generally are of lighter weight and of greater high-temperature strength than similar refractory metal structures devoid of a refractory ceramic particle content. A particular useful property of the compacted and sintered structures is that their thermal expansion properties may be varied by controlling the refractory ceramic particle content. Where the structures comprise coatings on various base materials or are portions of laminates, they may be provided with thermal expansion properties matching the thermal expansion properties of the base material or of other parts of the laminate by controlling the refractory ceramic particle content.

Referring now to the drawings, in which like members identify like parts, FIG. 1 depicts a diagrammatic illustration of an apparatus for carrying forth an embodiment of the process. For simplicity and clarity, the illustrated figure omits many auxiliary items, such as thermocouples, storage vessels and purification systems, valves, flow meters, pressure gauges, safety traps, acid absorbents, temperature controls, cyclone separators, and the like, although the use and application of such auxiliary items will be obvious and readily apparent to one skilled in the art.

The drawing illustrates a vertical reactor, generally designated 15, which is of a suitable chemical-resistant material, such as a high nickel-copper corrosion-resistant alloy known as "Monel" metal. The reactor 15 comprises a lower cylindrical section 16 circumferentially encompassing a reduction zone 17. Lower cylindrical section 16 at its lower end tapers into a lower conical section 18. Lower cylindrical section 16 at its upper end is joined, by means of an outwardly flared tubular section 19, to a larger diameter upper cylindrical section 20 which is closed by a top section 21. A plurality of feed inlet lines 22 and 22' are provided for introduction into the reactor of materials, such as the refractory metal halide, purified hydrogen gas, an auxiliary fluidization gas, and the like, and the fine refractory ceramic particles which are entrained and suspended in some or all of these introduced materials. The plurality of inlet lines 22 and 22' introduce such materials into the reactor region bounded by lower conical section 18. Lower conical section 18 at its apex is provided with a line 23 for removal of the particulate cermet product formed within the reactor 15. An inlet line 24 through top section 21 is provided for introduction of refractory seed particles into the reactor 15. Near the top of the larger diameter upper cylindrical section 20, an exit line 25 is provided for removal of exhaust gases and the like from the reactor 15. Externally surrounding the lower cylindrical section 16, a plurality of heater means is provided, generally designated 26, which, in the illustrated drawing, is depicted as electrical resistance heating coils.

While the illustrated reactor is described as constructed of a "Monel" metal or the like, other materials of construction which are suitably resistant to the particularly employed reactants at the process conditions of concern also may be used. For example, other high nickel-copper alloys and certain stainless steels are useful materials. Copper also is a useful material for inlet and outlet lines. Tetrafluoroethylene polymers are useful for gaskets and flexible lines. Other materials for construction of portions and all of the reactor will be readily apparent to one skilled in the art. Generally, rubber and resinous organic polymers are avoided as construction materials, because they tend to contaminate the system with minute amounts of impurities and make it difficult, if not impossible, to obtain high-purity cermets.

While the heating means 26 is depicted in the illustrated apparatus as a plurality of electrical resistance heating coils, other conventional heating means, such as flames, gas-fired furnaces, induction heaters, and the like, may be used, if desired.

In practice of an embodiment of the process with the illustrated apparatus, refractory seed particles, for example, high-purity tungsten metal particles of about 120 mesh size, U.S. Sieve Series, are introduced into the reactor through inlet line 24. The reactor preferably first is purged with an inert gas, such as argon or helium, or the like. After the purging, an auxiliary fluidization gas, if employed, such as helium or argon or the like, or a stream of purified hydrogen is introduced through inlet lines 22 or 22' to place the refractory seed particles in a fluidized state. In this disclosure, there is intended the conventional-art-recognized meanings of fluidized state, fluidized bed, and fluidized particles. The conventional fluidized state and fluidized bed consists of a mass of solid particles supported in a fluidizing medium, which mass of particles exhibits a liquid-like characteristic of mobility, hydrostatic pressure, and observable upper free surface or boundary zone across which a marked change in concentration of the particles occurs. With the seed particles in a fluidized state, the reduction zone, including the fluidized seed particles, are heated by means of the heater means to a suitable temperature, such as about 600° C., and maintained at a suitable temperature for hydrogen reduction of the employed refractory metal halide throughout the preparation of the cermet. Finely divided refractory ceramic particles, for example, particles of a refractory oxide such as magnesia or thoria or the like, of a particle size of about 0.01 micron to 5 microns, are introduced concurrently with reactants of hydrogen and a refractory metal halide, such as tungsten hexafluoride, into the reactor through inlet lines 22 or 22'. Preferably, the finely divided refractory ceramic particles are entrained and suspended in the introduced purified hydrogen, or an auxiliary fluidization gas, but, if desired, may be entrained and suspended in the vapor-state refractory metal halide or mixtures of these materials when charged to the reactor.

The amount of gaseous materials, including the hydrogen and refractory metal halide, passing through the refractory seed particles is such as to maintain the seed particles continuously in a fluidized state within the reactor during preparation of the cermet product. Most desirably, there is employed an amount of hydrogen considerably in excess of the stoichiometric amount to completely reduce the refractory metal halide.

In the aforedescribed process embodiment, employing tungsten hexafluoride, refractory oxide particles and fluidized bed temperature of about 600° C., a suitable amount of hydrogen is about 5 to 20 times the stoichiometric amount. In such embodiment, the excess hydrogen and gaseous by-products, primary hydrogen fluoride from the hydrogen reduction of the tungsten hexafluoride, function as a fluidization means to maintain the fluidized bed, and it is not necessary to employ an auxiliary fluidization gas. If desired, such an auxiliary fluidization gas may be employed as it provides a ready means to introduce the refractory oxide particles which may be entrained or suspended therein.

Within the reactor, a hydrogen reduction of the tungsten hexafluoride takes place and high-purity tungsten metal is formed and deposited as a coating on the fluidized seed particles. During the coating of the fluidized seed particles, refractory oxide particles are entrapped, or, in some manner or other, adhere to and become embedded in the deposited tungsten coating to thus provide the particulate cermets. To shut down operation of the process, the flow of tungsten hexafluoride, hydrogen, and refractory oxide particles to the reactor are discontinued and replaced by a flow of an inert gas, such as argon, helium, and the like, which inert gas continues to maintain the fluidized bed. Heating of the reduction zone also is discontinued. After the reduction zone, including the fluidized bed therein, has cooled to a sufficiently low temperature, generally about 100° F., with the inert gas flowing therethrough, the flow of inert gas is discontinued and the particulate cermet product discharged through exit pipe 23.

During the process, excess hydrogen gas and gaseous by-products, primarily hydrogen fluoride or the like, comprise the gases exiting from the fluidized bed of particles in the reactor 15. As these exhaust gases leave the reduction zone 17 and flow into the upper regions of the reactor 15, there is a change of the space velocity of these gases due to upper cylindrical section 20 being of larger diameter than lower cylindrical section 16. This change in space velocity from the larger diameter upper cylindrical section 20 functions as an expansion chamber for the exhaust gases with seed particles and refractory oxide particles entrained in the exhaust gases being returned to the reduction zone 17. From the upper regions of the reactor 15, the exhaust gases pass and leave the reactor through exit line 25. The removed exhaust gases may be used for preheating the introduced hydrogen gas, refractory metal fluoride, fluidization gas, or the like, or for other purposes. If desired, such exhaust gases may be recirculated and used as a fluidization gas. It then frequently is necessary that such exhaust gases be separated into various component fractions, such as by scrubbing to remove hydrogen fluoride. If desired, any or all of the various fractions of the exhaust gases may be used for various purposes. For example, hydrogen recovered from the exhaust gases and refractory oxide particles recovered from the exhaust gases may be reused in carrying forth the process.

While the aforedescribed practice of the process has been of a batch manner of operation, the process may, if desired, be practiced in a continuous manner. In a continuous operation, the refractory metal halide and hydrogen gas are charged continuously, particulate cermet product is removed continuously or periodically, as desired, through exit pipe 23, and additional refractory seed particles are added through inlet 24 to replenish the fluidized bed continuously or periodically, as desired.

FIG. 2 and FIG. 3 illustrate, enlarged and somewhat out of proportion, cross-sectional views of cermet particles, generally designated 5 and 5', respectively, of the invention. Cermet particle 5 comprises in inner core 6 of a refractory seed, such as tungsten metal, with the outer boundary of this inner core 6 depicted by the dotted line 7. Surrounding and tightly adhering to inner core 6 is a refractory metal matrix 8, such as tungsten metal, having embedded and dispersed therein a plurality of minute refractory ceramic particles 9, such as refractory oxide particles. Cermet particle 5' comprises throughout a refractory metal 8' having embedded and dispersed therein a plurality of minute refractory oxide particles 9'. In each of FIGS. 2 and 3, the size of particles 9 and 9' is enlarged and out of true porportion to the size of the cermet particles 5 and 5'.

While the illustrated cermet particles and illustrated apparatus and its use for practice of the process have been described with particularity by reference to tungsten hexafluoride, tungsten seed particles, and refractory oxide particles, it will be readily apparent that other seed particles, other refractory metal halides, and other refractory ceramic particles may be employed.

In place of the tungsten seed particles, there may be employed seed particles of any of the refractory metals, such as tungsten, tantalum, niobium, molybdenum, mixtures and alloys thereof, and the like. By the term "refractory metal," it is intended that all metals which are recognized as refractory in nature and which, in a pure state, having a melting point above about 1500° C. be included. In one extremely useful embodiment, the seed particles are particulate cermet particles which contain substantial amounts of a refractory metal, such as particulate cermets or portions of particulate cermets produced in a previous run of the process of the development. Alternatively, the seed particles may consist essentially of particles of refractory ceramic materials. In general, the seed particles may range in particle size from about −20 to +325 mesh, U.S. Sieve Series. Seed particles of larger and smaller sizes generally are not readily fluidized, although in some applications they may be used.

In place of the tungsten hexafluoride, there may be used halides of numerous refractory metals, such as the various halides of tungsten, niobium, tantalum, molybdenum, mixtures thereof, and the like. In most instances, and preferably so, the refractory metal halide employed is a higher halide, such as tungsten hexafluoride, niobium pentafluoride, tantalum pentafluoride, molybdenum hexafluoride, tungsten hexachloride, niobium pentachloride, and the like, although some lower halides of such refractory metals are useful, generally when in admixture with a higher halide of the refractory metal. When a mixture of halides of several refractory metals is employed, the halide proportions, the process temperature, and excess hydrogen ratios must be carefully selected to permit an operative coreduction of the several halides and codeposition of the several refractory metals and the ceramic particles in the desired ratio onto the fluidized seed particles.

In place of the described refractory oxide particles, there may be used other refractory ceramic particles which are substantially irreducible by hydrogen and substantially nonreactive with the employed reactants and resulting by-products under the conditions at which the refractory metal is prepared from the refractory metal halide. Useful refractory oxides include magnesia, thoria, alumina, zirconia, beryllia, yttria, urania, titania, chromia, rare earth oxides, mixtures thereof, and the like. Other useful refractory ceramtic particles include tungsten carbide, zirconium carbide, and their borides, or nitrides, or the like.

The introduced refractory ceramic particle should be of a particle size of −400 mesh, U.S. Sieve Series, i.e., less than about 37 microns in size, and desirably should be of a particle size of less than about 5 microns. Particles of a large size are not readily entrained and suspended into the vapor state materials charged into the reactor and also are not entrapped in the refractory metal deposited coating. While particles larger than about 37 microns in size can be entrained and suspended so as to be introduced into the fluidized bed of seed particles, entrapment of such larger particles rarely occurs, even when employing seed particles as large as about ⅛ inch in diameter. Apparently with particles larger than about 37 microns there is insufficient anchoring of the particles to the seed particles by the depositing refractory metal or impinging fluidized particles. It is possible that such particles larger than about 37 microns in size anchor momentarily and then are knocked loose by a bombarding action of the fluidized particles, so that such larger particles rarely are found embedded in the resulting particulate cermet. In fact, particles of a size between about 5 and 37 microns are not easily embedded and anchored to the seed particles under most conditions suitable for preparation and deposition of a refractory metal on fluidized seed particles. To successfully produce a cermet containing refractory ceramic particles of a size between about 5 and 37 microns, it usually is necessary to produce and deposit the refractory metal at conditions which normally favor agglomeration and freezing of the fluidized bed of seed particles. Apparently under such process conditions there exists sufficient cohesive action by the depositing refractory metal to embed these larger particles in the depositing coating. For example, in a fluid-bed-type process for production of niobium metal by hydrogen reduction of niobium pentachloride with the niobium metal so produced being deposited on fluidized particles of niobium, the usual fluidized bed temperatures are about 1500° F. At about temperatures of 1600°–1700° F. and higher, prolonged operation of such a niobium metal production process usually is not feasible due to a sintering and agglomerating of the fluidized particles and a loss of the fluidized state. However, at a temperature of about 1750° F., suspended and entrained refractory oxide particles as large as about 35 to 40 microns can be introduced in this fluid-bed-type process for production of niobium and are successfully embedded in the niobium metal deposited on the fluidized niobium seed particles. Advantageously in such a preparation of a cermet consisting essentially of niobium metal and refractory oxide particles as large as about 37 microns embedded therein, there is a decidedly lesser tendency for agglomeration and sintering of the fluidized seed particles than when no refractory oxide particles are introduced. Preferably the particles are of 0.01 to 5 microns in diameter. Particles of extremely fine size tend to adhere in greater proportions on the seed particles, but also tend to be entrained in substantial amounts and to be carried out of the reactor in the exhaust gases. Particles finer than about 0.01 micron generally are not used because they are not commercially available. The smaller the amount of refractory ceramic particles entrained and introduced, the lower the refractory ceramic particle content of the resulting cermet and the higher the efficiency of utilization of introduced particles with the result that larger proportions of the introduced particles are contained in the resulting cermet. Likewise, the larger the amount of refractory ceramic particles entrained and introduced, the higher the particle content of the resulting cermet and the lower the efficiency of utilization of introduced particles with the result that smaller proportions of the introduced refractory ceramic particles are contained in the resulting cermet. By an appropriate choice of size and amount of the particles to be introduced, the refractory ceramic particle content of the resulting cermet can be varied widely and a cermet can be produced with almost any desired refractory ceramic particle content up to about 75 percent by volume of the cermet.

Desirably, high silicon content refractory oxides such as silica, are avoided in fluoride deposition systems unless the particles thereof are precoated with a suitable material, such as a ceramic glaze, or a refractory metal, or the like, to avoid interaction with some reactants and gaseous by-products. If desired, any or all of the refractory ceramic particles charged to the reactor may be precoated or plated with materials such as a high melting point metal, or a refractory metal, or a ceramic glaze prior to introduction. Any of the methods known to the art may be employed to precoat such refractory ceramic particles.

The temperature at which the fluidized bed of refractory seed particles is maintained for practice of the process can be varied to some extent and depends greatly on the particular refractory metal halide and excess hydrogen ratios employed. For example, with tungsten fluorides, and in particular tungsten hexafluoride, temperatures between about 200° to 1000° C. and excess hydrogen ratios of 1 to 50 times the stoichiometric amount to reduce completely the hexafluoride to the tungsten metal are suitable, with temperatures of 550° to 650° C. and excess hydrogen ratios between 5 and 20 being preferred. In general. the larger excess hydrogen ratios are of greatest utility at the lower temperatures and the lower excess hydrogen ratios are of greatest utility at the higher temperatures. With niobium fluorides, temperatures between 500° to 1100° C. and excess hydrogen ratios of 20 to 500 times the stoichiometric amount to reduce completely the fluoride to niobium metal are suitable with temperatures of 700° to 900° C. and an excess hydrogen ratio of 100 being preferred. With tantalum fluoride temperatures between 600° and 1200° C. and excess hydrogen ratios of 40 to 1000 times the stoichiometric amount to reduce completely the fluoride to tantalum metal are suitable with temperatures of 800° to 1000° C. and an excess hydrogen ratio of 200 being preferred. With molybdenum fluoride temperatures betwen 300° to 1000° C. and excess hydrogen ratios of 2 to 100 times the stoichiometric amount to reduce completely the fluoride to molybdenum metal are suitable with temperatures of 500° to 700° C. and excess hydrogen ratios of 10 to 50 being preferred. Suitable fluid-bed-type process conditions for a hydrogen reduction of a number of refractory metal halides are taught in the art, as illustrated by Canadian Pat. No. 610,592 and U.S. Pat. No. 2,943,931. In general, in light of this disclosure together with prior art teachings, suitable and optimum conditions for carrying forth the process with various refractory metal halides and halide mixtures can readily be selected with little or no experimentation by one skilled in the art.

The hydrogen gas employed for the process should be substantially free from all impurities, and in particular oxygen, nitrogen, carbon dioxide, hydrocarbon impurities, and in most instances moisture. Commericially available electrolytic hydrogen after suitable purification is useful. Purification may be by passage of an eletrolytic hydrogen over a silicate gel, a catalytic burner (such as a "De-Oxo purifier," containing a palladium catalyst and a desiccator to remove oxygen and water from the gas stream, made by the Baker Company, Newark, N.J.), a molecular sieve absorbent (such as a Dry-Ice cooled tube containing dehydrated crystals of calcium alumina silicate), or a getter furnace of a heated bed of calcium or titanium chips. More desirably, purification of electrolytic hydrogen is by passage through a high-capacity palladium diffusion unit, such as manufactured by the Engelhard Industries Incorporated, Newark, N.J. In most instances it is desirable that the charged hydrogen gas be substantially moisture free. However, when employing those refractory oxide particles which tend to react with various reactants and by-products within the reactor, it may be desirable to charge a minute, but controlled amount of moisture into the reduction zone. Most generally though, the use of such moisture is avoided because of corrosion of the materials from which the reactor is constructed and to avoid possible contamination of the product.

The following specific examples will serve to provide a still further clearer and better understanding of the invention and its advantages. All "percents" and "parts" as used in the examples and disclosure and the claims are percent and parts by weight, unless expressly stated otherwise.

EXAMPLE I

About 833 grams of high-purity tungsten metal seed particles ranging in size from −150 to +200 mesh, U.S. Sieve Series, are placed in a two-inch diameter reduction zone of a vertically positioned, nickel-copper alloy, tubular reactor. The seed particles are suspended in a fluidized state within the reactor by flowing hydrogen therethrough and brought to a temperature of about 600° C. by a plurality of electrical heating elements externally surrounding the reactor's reduction zone. A hydrogen gas flow of 1½ c.f.m. (cubic feet per minute) maintains the particle in a fluidized state. When the bed of fluidized seed particles reaches about 600° C., vapor-state tungsten hexafluoride is admixed with the hydrogen being charged into the bed of fluidized tungsten metal seed particles. The amounts of hydrogen and tungsten hexafluoride charged into the fluidized seed particles are such as to provide a molar ratio of hydrogen to tungsten hexafluoride during the course of the reaction of about 9.4 times the stoichiometric amount of hydrogen to reduce completely the tungsten hexafluoride to tungsten metal. Entrained and suspended in the hydrogen and tungsten hexafluoride being charged to the reactor is a quantity of finely divided magnesia particles ranging in size from 0.5 to 2 microns in diameter. Charging of the magnesia particles, the tungsten hexafluoride, and the hydrogen are continued for about one hour. During this charging period, about 16 grams of the magnesia particles are entrained and suspended in the hydrogen and tungsten hexafluoride and in this manner introduced into the reactor. The temperature of the reaction zone and fluidized particle bed are maintained at about 600° C. during the charging. After one hour the introduced flows of tungsten hexafluoride, hydrogen, and magnesia particles are discontinued and replaced by a flow of argon gas sufficient to maintain the particles within the reactor in a fluidized state. Heating of the reduction zone then also is discontinued. The argon gas flow is continued until the reduction zone and its contents cooled to about 100° F. The cooled resulting particulate cermet product then is discharged from the reactor and found to weigh about 1300 grams.

The particulate cermet product produced consists essentially of 99.85 percent by weight of tungsten and 0.15 percent by weight of magnesia. The particulate cermet product consists essentially of individual cermet particles ranging in size from about −80 to +150 mesh, U.S. Sieve Series, with the individual cermet particles consisting essentially of a tungsten metal core overcoated with a 99.58 percent by weight of a tungsten metal matrix having about 0.42 percent by weight of finely divided magnesia particles distributed and embedded in the tungsten metal matrix. The tungsten metal consists of high-purity, extremely fine tungsten metal crystals. Based on the tungsten content of tungsten hexafluoride charged to the reactor, more than 93 percent of the tungsten is deposited and recovered in the particulate cermet product, and about 12 percent of the introduced magnesia particles is embedded in the cermet product. The overall production rate of cermet product averages 43.9 pounds per hour per square foot of cross-sectional area of the reduction zone.

EXAMPLE II

A portion of the particulate cermet product of Example I is comminuted to provide particulate cermets ranging in size from −150 to +200 mesh, U.S. Sieve Series. These particulate cermets then are employed to replace the high-purity tungsten metal seed particles charged to the reactor tube and the process described in Example I repeated. The resulting particulate cermet product consists essentially of high-purity, extremely fine tungsten metal of minute particles of magnesia embedded in a balance essentially of high-purity, extremely fine tungsten metal crystals. By comminution of the resulting particulate cermet product of Example II and employing this comminuted product as the seed particles in again carrying forth the process described in Example I, there is obtained a particulate cermet product with a magnesia particle content of 0.42 percent.

EXAMPLE III

The process described in Example I is carried forth in a continuous manner by withdrawing portions of the particulate cermets produced, while continuing the charging of the hydrogen, tungsten hexafluoride, and magnesia particles. Portions of the withdrawn particulate cermet products are comminuted to about −150 to +200 mesh, U.S. Sieve Series, and reintroduced into the reactor, as needed, to maintain the fluidized bed of seed particles within the reactor at a substantially uniform height. After continuing this procedure for an extended period of time, the withdrawn particulate cermets are found to consist essentially of individual, substantially homogenous particles, each particle consisting essentially of about 99.6 percent by weight tungsten metal matrix and 0.4 percent of minute magnesia particles substantially uniformly dispersed throughout the tungsten metal matrix.

EXAMPLE IV

In a manner like that of Example I there is prepared a particulate cermet in which minute particles of thoria are introduced in place of the minute magnesia particles. About 1000 grams of high-purity tungsten metal particles ranging in size from −100 to +200 mesh, U.S. Sieve Series, are employed as the seed particles. The fluidized bed is maintained at a temperature of about 600° C. and the thoria particles are suspended in the mixture of hydrogen gas and tungsten hexafluoride with this mixture being charged for about one hour to the reactor. The thoria particles employed range in particle size from 0.5 to 2 microns in diameter. The molar ratio of hydrogen to tungsten hexafluoride in the charged mixture averages 11.4 times the stoichiometric amount to reduce completely the tungsten hexafluoride to tungsten metal. During the charging of the mixture, about 104 grams of the thoria particles are entrained and suspended in the charged mixture and in this manner introduced into the reactor.

The particulate product produced weighs about 1402 grams and consists essentially of 99.04 percent by weight of tungsten metal and 0.96 percent by weight of thoria. The particulate cermet product consists essentially of individually cermet particles ranging in size from about −60 to +150 mesh, U.S. Sieve Series, with the individual particles consisting essentially of a tungsten metal core overcoated with a 96.35 percent by weight tungsten metal matrix having about 3.65 percent by weight of the thoria particles distributed and embedded in the deposited tungsten metal matrix. The tungsten metal consists of high purity, extremely fine grained tungsten metal crystals. Based on the tungsten content of the tungsten hexafluoride charged to the reactor, more than 95 percent of the tungsten is deposited and recovered in the particulate cermet product, and about 13 percent of the introduced thoria particles are embedded in the cermet product. The overall production rate of cermet product averages 37.8 pounds per hour per square foot of cross-sectional area of the reduction zone.

EXAMPLE V

An amount of 1000 grams of high-purity molybdenum metal seed particles ranging in size from −20 to +150 mesh, U.S. Sieve Series, are charged to a reduction zone of a tubular reactor. After purging the reactor thoroughly with argon gas and bringing the reduction zone to a temperature of 650° C., an admixture of purified hydrogen gas and molybdenum hexafluoride are introduced into the reactor. Suspended and entrained in the mixture of hydrogen gas and molybdenum hexafluoride are zirconia particles of about 0.1 to 2 microns size. The mole ratio of hydrogen to molybdenum hexafluoride in the charged admixture is 15.2 times the stoichiometric amount to reduce completely the molybdenum hexafluoride to molybdenum metal. The amount and velocity of the introduced hydrogen gas is such as to place the charged molybdenum seed particles in a fluidized state. The fluidized state, the 650° C. temperature, and the excess hydrogen ratio of about 15.2 times are maintained during the course of the reaction, which is carried forth for about 150 minutes. During this 150 minutes of charging, about 400 grams of the zirconia particles are suspended and entrained in the mixture and in this manner introduced into the reactor. Upon cessation of the charging of the mixture, the heating of the reduction zone is discontinued and a fluidized flow of argon gas passed through the reactor. When the reactor cools to near room temperature, the produced particulate cermet product is discharged and found to weigh about 1645 grams.

The produced particulate product consists essentially of 95.1 percent by weight of molybdenum and 4.9 percent by weight of zirconia. The particulate cermet product consists essentially of individual cermet particles ranging in size from −16 to +80 mesh, U.S. Sieve Series, with the individual cermet particles consisting essentially of a molybdenum core overcoated with a 87 percent by weight molybdenum metal matrix having about 13 percent by weight of zirconia particles distributed and embedded in the molybdenum metal matrix. The molybdenum metal consists of high-purity, extremely fine molybdenum metal crystals. The molybdenum metal produced and deposited on the molybdenum metal seed particles amounts to a yield of better than 99 percent, based on the molybdenum content of the charged molybdenum hexafluoride. In excess of about 20 percent of the charged zirconia particles are found to be embedded in the resulting particulate cermet product. The over-all production rate of the cermet

EXAMPLES VII–X

Additional particulate cermet products are prepared generally in the manners described in the preceding examples except for the amounts employed and the employing of a number of other starting materials, such as other refractory particles in various sizes and amounts. The following Table I sets forth the details of a number of these particulate cermet products and their production.

TABLE I

| Example No. | VII | VIII | IX | X |
|---|---|---|---|---|
| Starting materials: | | | | |
| Seed material | Ta | W | Comminuted cermet product of Ex. VIII. | Cermet 91% W, 9% $ThO_2$. |
| Seed particle size [1] | 125 | 225 | 89 | 100 |
| Refractory metal halide | $TaCl_5$ | $WCl_6$ | $WCl_6$ | $WCl_6$ |
| Excess hydrogen ratio [2] | 80 | 20 | 20 | 20 |
| Refractory oxide material | Ni coated $SiO_2$ [3] | $ThO_2$ | $ThO_2$ | $ThO_2$ |
| Refractory oxide particle size [2] | 3 | 2 | 2 | 2 |
| Particulate cermet: | | | | |
| Particle size [1] | 250 | 403 | 127 | 200 |
| Composition over-all | 90% Ta<br>10% Ni coated $SiO^2$ particles | 95% W<br>5% $ThO_2$ particles | 95% W<br>5% $ThO_2$ particles | 94% W<br>94% W<br>$ThO_2$ particles.<br>6% $ThO_2$ particles. |
| Core | 100% Ta | 100% W | 95% W<br>5% $ThO_2$ particles | 91% W<br>9% $ThO_2$ particles. |
| Overcoating | 89% Ta<br>11% Ni coated $SiO_2$ particles | 94% W<br>6% $ThO_2$ particles | 95% W<br>5% $ThO_2$ particles | 95% W<br>5% $ThO_2$ particles. |

[1] All particle sizes are expressed in microns and are the average size.
[2] Number of times of the molar ratio of the stoichiometric amount of hydrogen to reduce completely the refractory metal halide to the refractory metal.
[3] These Ni coated $SiO_2$ particles are prepared by passing hot 250° C. silica particles through a 1:25 molar ratio of nickel carbonyl in argon.

product averages 25 pounds per hour per square foot of cross-sectional area of the reduction zone.

EXAMPLE VI

About 75 grams of niobium metal particles of about −80 mesh, U.S. Sieve Series, particle size are charged into an about ⅞ inch internal diameter, vertically positioned, silica tube, and while within the silica tube are fluidized by flowing argon gas upwardly therethrough. While the particles are fluidized by the argon gas, the niobium metal particles are heated to about 925° C. The flow of argon gas is gradually decreased and replaced by a mixture of hydrogen gas and vaporized niobium pentachloride having suspended and entrained within the mixture silica particles of from 0.5 to 35 microns particle size. The mixture is introduced at a flow rate of about ½ cubic foot per minute, a flow rate sufficient to maintain the niobium metal particles in a fluidized state. The charged mixture contains hydrogen gas in a molar ratio to vaporized niobium pentachloride of about 80 times the stoichiometric amount to reduce completely the pentachloride to niobium metal. The charging of the reactor with the mixture is continued for about 2 hours during which time a total amount of 10 grams of the silica particles are suspended and entrained in the mixture and thus introduced into the reactor. During this charging the fluidized particles within the reactor are maintained at about 925° C. Upon cessation of the introduction of the mixture, the heating of the fluidized particles is discontinued and a fluidizing flow of argon gas passed through the reactor. When the reactor has cooled to about room temperature, the argon flow is discontinued and the particulate cermet product is discharged.

The particulate cermet produced consists essentially of 95 percent by weight of niobium and 5 percent by weight of silica. The particulate cermet product consists essentially of individual cermet particles ranging in size from about −60 to +80 mesh, U.S. Sieve Series, with the individual cermet particles consisting essentially of a niobium metal core overcoated with a 74 percent by weight niobium metal matrix having about 26 percent by weight of silica particles distributed and embedded in the niobium metal matrix. Based on the niobium content of the niobium pentachloride, more than 80 percent of the niobium is deposited and recovered in the particulate product, and in excess of about 50 percent of the introduced silica particles is embedded in the cermet product.

Particulate cermet products of the process may be employed in particle form for a number of applications. The particulate cermet products are quite useful as a master component alloying additive for obtaining uniform and rapid distribution of refractory ceramic materials in metals and metal alloys for grain-growth inhibition purposes and the like. The particulate cermet products are useful as particulate abrasive scouring agents which are projected against various materials to cleanse their surfaces. More generally though, a plurality of the cermet product particles are compacted into a dense mass. Such compacting is preferably by isostatic gas bonding processes. Alternatively, the particles may be sintered, or fused, or melted. The massive cermet structures are useful for applications, such as filaments, wires, linings, frames, containers, nozzles, coatings, and the like. For example, the particulate cermet product of Example IV, when compressed and then sintered by passing an electrical current therethrough, can be drawn into an electrical filament superior in high temperature creep resistance to a similar filament devoid of thoria particles. In such structures and articles, the refractory ceramic material therein functions as a grain-growth inhibitor during fabrication and also during high-temperature application and usage of these structures and articles. Various methods known to the art for compacting and sintering of refractory metal particles into massive structures, in general, are useful to compact and sinter the particulate cermet products. For example, electron beam melting may be used.

It will be apparent to those skilled in the art that various embodiments, changes and modifications, other than described in the aforegoing disclosure, of the process will be possible without departing from the true spirit and scope of the process. It is desired to include all such apparent and obvious embodiments, changes and modifications.

We claim:
1. A process for producing a particulate cermet, which process includes:
  (a) concurrently introducing into a fluidized bed of seed particles of refractory metal particles, refractory metal particles having refractory ceramic particles embedded and dispersed therein or refractory ceramic particles, said seed particles having a particle size of −20 to +325 mesh, U.S. Sieve Series, a halide of a refractory metal, hydrogen gas and refractory ceramic particles having a particle size of

−400 mesh, U.S. Sieve Series, at a temperature enabling the hydrogen reduction of the halide with the refractory ceramic particles being substantially irreducible while within the fluidized bed of the seed particles; and (b) concurrently codepositing said introduced refractory ceramic particles and refractory metal onto the fluidized seed particles.

2. The process of claim 1 in which the seed particles are refractory metal particles.

3. The process of claim 2 including the concurrently introducing of refractory oxide particles as the refractory ceramic particles.

4. A process for producing a particulate cermet, which process includes:

(a) concurrently introducing a higher fluoride of a refractory metal, hydrogen gas in a molar ratio of hydrogen to the higher fluoride of from 1 to 500 times the stoichiometric amount to reduce completely the higher fluoride to the refractory metal, and refractory oxide particles of 0.01 to 5 microns size into refractory metal seed particles of −20 to +325 mesh, U.S. Sieve Series, maintained in a fluidized state and at a temperature enabling the hydrogen reduction of the higher fluoride with the refractory oxide particles being substantially irreducible while within the fluidized bed of the refractory metal seed particles; and (b) concurrently codepositing said refractory oxide particles and refractory metal onto the refractory metal seed particles.

5. A process for producing particulate cermets consisting essentially of refractory metal particles coated with tungsten metal having refractory oxide particles embedded and dispersed therein, which process comprises:

(a) introducing reactants of purified hydrogen gas and tungsten hexafluoride into a reduction zone containing refractory metal seed particles of −20 to +325 mesh, U.S. Sieve Series, with the reduction zone being at a temperature of 200° to 1000° C., with the hydrogen gas being introduced at a velocity sufficient to fluidize said seed particles, and with the molar ratio of introduced hydrogen gas to tungsten hexafluoride being from 1 to 50 times the stoichiometric amount to reduce completely the hexafluoride to tungsten metal;

(b) concurrently introducing into the fluidized refractory metal seed particles refractory oxide particles from 0.01 to 5 microns in diameter and substantially irreducible in the reduction zone; and (c) codepositing said refractory oxide particles and tungsten metal onto the fluidized refractory metal seed particles.

6. The process of claim 5 including the concurrently introducing of magnesia particles as the refractory oxide particles.

7. The process of claim 5 including the concurrently introducing the thoria particles as the refractory oxide particles.

8. The process of claim 5 including the concurrently introducing of refractory oxide particles coated with a metal other than a refractory metal.

9. The process of claim 5 in which the concurrently introduced refractory oxide particles are entrained and suspended in at least one of the introduced reactants when introduced into the refractory metal seed particles.

10. The process of claim 5 in which the concurrently introduced refractory oxide particles are entrained and suspended in an inert gas which assists in fluidization of the refractory metal seed particles.

References Cited

UNITED STATES PATENTS

| | | | |
|---|---|---|---|
| 3,012,876 | 12/1961 | Eaton et al. | 117—100 X |
| 3,043,679 | 7/1962 | Campbell et al. | 117—100 X |
| 3,069,292 | 12/1962 | Alexander et al. | 117—100 |
| 3,082,084 | 3/1963 | Alexander et al. | 117—100 X |
| 3,122,595 | 2/1964 | Oxley | 117—100 X |
| 3,137,927 | 6/1964 | Huegel et al. | 75—206 X |
| 3,178,308 | 4/1965 | Oxley et al. | 117—107.2 X |
| 3,192,042 | 6/1965 | Spacil | 75—212 X |
| 3,234,007 | 2/1966 | Blocher et al. | 117—100 X |
| 3,265,521 | 8/1966 | Spacil | 117—22 |
| 3,310,400 | 3/1967 | Alexander et al. | 117—100 X |

WILLIAM D. MARTIN, Primary Examiner

E. J. CABIC, Assistant Examiner

U.S. Cl. X.R.

75—84.4, 212, 206; 117—107.2